US011206235B1

(12) United States Patent
Sarkar et al.

(10) Patent No.: US 11,206,235 B1
(45) Date of Patent: Dec. 21, 2021

(54) SYSTEMS AND METHODS FOR SURFACING CONTENT

(71) Applicant: Facebook, Inc., Menlo Park, CA (US)

(72) Inventors: Shilpa Sarkar, San Francisco, CA (US); Mari Sheibley, San Francisco, CA (US); Lu D. Chen, Menlo Park, CA (US); Vincent Yu-Shien Chen, Santa Clara, CA (US); Nayeon Kim, San Franicsco, CA (US); Ankur Sadhoo, Fremont, CA (US); Rohan Roy Choudhury, San Francisco, CA (US); Aman Jain, Palo Alto, CA (US); Lukas Camra, San Francisco, CA (US); Ang Li, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/963,931

(22) Filed: Apr. 26, 2018

(51) Int. Cl.
| | |
|---|---|
| *G06F 15/16* | (2006.01) |
| *H04L 12/58* | (2006.01) |
| *H04L 29/06* | (2006.01) |

(52) U.S. Cl.
CPC .............. *H04L 51/32* (2013.01); *H04L 51/10* (2013.01); *H04L 65/4076* (2013.01); *H04L 65/608* (2013.01)

(58) Field of Classification Search
CPC ..... H04L 51/32; H04L 51/10; H04L 65/4076; H04N 21/2187; H04N 21/231; H04N 21/2343; H04N 21/2743
USPC ................ 709/206, 204, 231, 247, 217, 227
See application file for complete search history.

(56) References Cited

U.S. PATENT DOCUMENTS

| | | | | |
|---|---|---|---|---|
| 2003/0118974 A1* | 6/2003 | Obrador | ................. | G09B 23/28 434/236 |
| 2004/0153504 A1* | 8/2004 | Hutchinson | ............ | G06Q 10/10 709/204 |
| 2008/0307105 A1* | 12/2008 | Sethi | ........................ | H04N 7/15 709/231 |
| 2009/0074377 A1* | 3/2009 | Herz | ........................ | H04N 5/85 386/241 |
| 2009/0164484 A1* | 6/2009 | Horowitz | ............ | H04N 21/8133 |
| 2014/0123014 A1* | 5/2014 | Keen | ..................... | H04L 51/046 715/719 |
| 2015/0370402 A1* | 12/2015 | Checkley | .............. | G06F 3/0416 345/173 |
| 2016/0007052 A1* | 1/2016 | Haitsuka | ............ | H04N 21/2407 725/115 |

(Continued)

OTHER PUBLICATIONS

LaShawn. "Instagram Stories:How to Use It and How It Can Change the Game." Everyday Eyecandy, Sep. 12, 2016 (obtained from wayback machine), everydayeyecandy.com/how-to-use-instagram-stories/. (Year: 2016).*

*Primary Examiner* — Kaylee J Huang
(74) *Attorney, Agent, or Firm* — Sheppard Mullin Richter & Hampton LLP

(57) ABSTRACT

Systems, methods, and non-transitory computer-readable media can determine that broadcasting of a live content stream has concluded. The concluded live content stream is converted to a post live media content item. The post live media content item corresponding to the concluded live content stream is published through the social networking system. The post live media content item remains accessible through the social networking system for a pre-determined period of time.

17 Claims, 11 Drawing Sheets

(56) References Cited

U.S. PATENT DOCUMENTS

2016/0105388 A1* 4/2016 Bin Mahfooz ........... G06F 3/16
709/206
2016/0277802 A1* 9/2016 Bernstein ........... H04N 21/4307
2018/0160254 A1* 6/2018 Liu ..................... H04L 65/4076

* cited by examiner

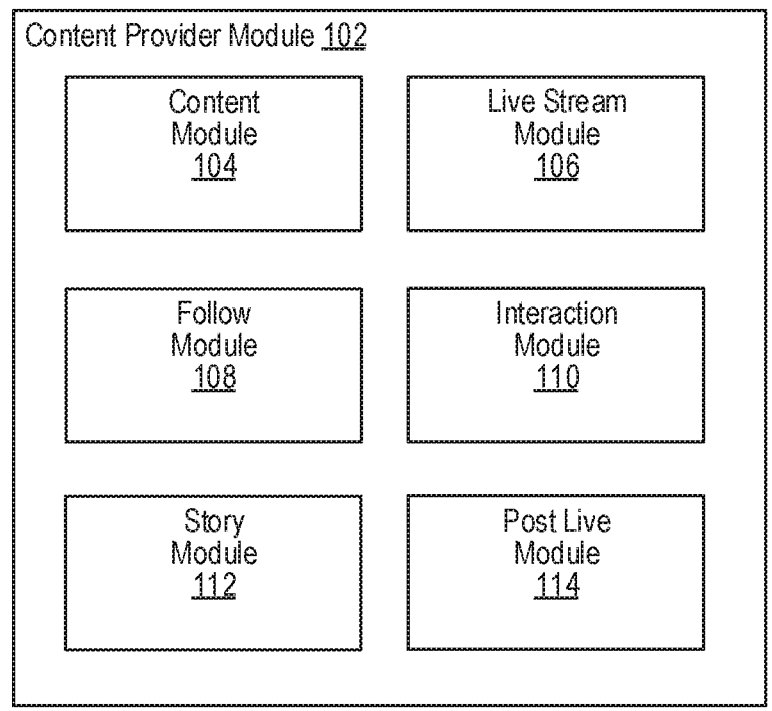
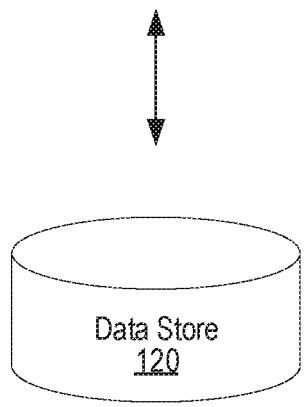
FIGURE 1

500

```
┌─────────────────────────────────────────┐
│ Determine that broadcasting of a live content │
│         stream has concluded            │
│                  502                    │
└─────────────────────────────────────────┘
                    │
                    ▼
┌─────────────────────────────────────────┐
│ Convert the concluded live content stream to a post live media │
│              content item               │
│                  504                    │
└─────────────────────────────────────────┘
                    │
                    ▼
┌─────────────────────────────────────────┐
│ Publish the post live media content item corresponding to the │
│ concluded live content stream through the social networking │
│ system, wherein the post live media content item remains │
│ accessible through the social networking system for a pre- │
│           determined period of time           │
│                  506                    │
└─────────────────────────────────────────┘
```

FIGURE 5

SYSTEMS AND METHODS FOR SURFACING CONTENT

FIELD OF THE INVENTION

The present technology relates to the field of content provisioning. More particularly, the present technology relates to techniques for providing content broadcasts.

BACKGROUND

Users often utilize computing devices for a wide variety of purposes. Users can use their computing devices to, for example, interact with one another, access media content, share media content, and create media content. In some cases, media content can be provided by members of a social network. The media content can include one or a combination of text, images, videos, and audio. The media content may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine that broadcasting of a live content stream has concluded. The concluded live content stream is converted to a post live media content item. The post live media content item corresponding to the concluded live content stream is published through the social networking system. The post live media content item remains accessible through the social networking system for a pre-determined period of time.

In some embodiments, the post live media content item is made accessible to users of the social networking system that follow at least one broadcaster of the live content stream in the social networking system.

In some embodiments, the post live media content item is included in a live story collection associated with at least one broadcaster of the live content stream, and wherein the live story collection includes at least the post live media content item and a second post live media content item associated with the at least one broadcaster, and wherein the live story collection includes post live media content items that were created by the at least one broadcaster during a pre-defined period of time.

In some embodiments, users that access the live story collection are shown the post live media content item and the second post live media content item in chronological order.

In some embodiments, users that access the post live media content item are shown a feed of comments that were posted during broadcasting of the live content stream.

In some embodiments, the systems, methods, and non-transitory computer readable media are configured to generate a set of skip points for the post live media content item, wherein each skip point is associated with a corresponding start time at which the post live media content item is played.

In some embodiments, a given skip point is accessed in response to one or more touch screen gestures.

In some embodiments, a start time corresponding to a given skip point is determined based at least in part on an amount of viewer feedback received during at least one portion of the live content stream during broadcasting.

In some embodiments, the systems, methods, and non-transitory computer readable media are configured to provide an interface for interacting with the social networking system and provide at least one avatar associated with at least one broadcaster of the post live media content item in a stories tray in the interface.

In some embodiments, the at least one avatar is able to be selected to access at least the post live media content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example content provider module, according to an embodiment of the present disclosure.

FIG. 5 illustrates an example method, according to an embodiment of the present disclosure.

Figure 2:
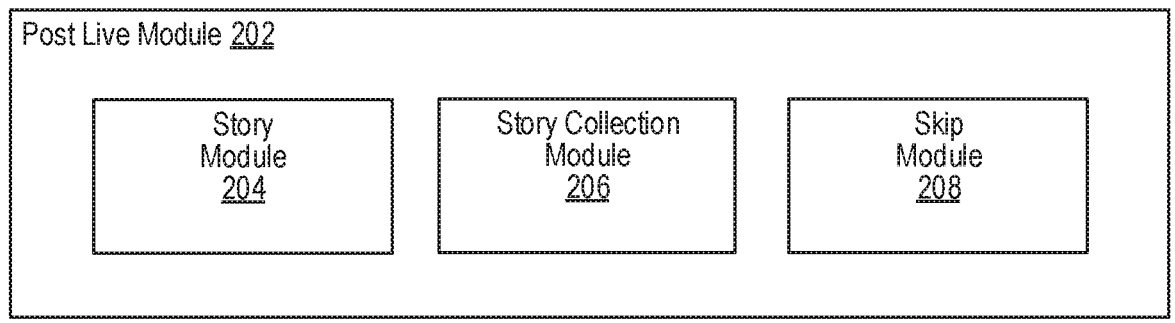
FIG. 2 illustrates an example of a post live module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Surfacing Content

Under conventional approaches, content may be broadcast through a content provider (e.g., social networking system) using various broadcast mediums (e.g., Internet broadcasting, etc.). In one example, a live content stream can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the content provider. In response, the content provider encodes and provides data corresponding to the live content stream to the user's computing device over a network (e.g., the Internet) in real-time. The computing device can decode and present the live content stream, for example, through a display screen of the computing device. In general, the live content stream continues to be provided to the user's computing device until the broadcaster discontinues broadcasting the live content stream or the user instructs the computing device to stop accessing the live content stream, for example. Under conventional approaches, the live content stream is typically no longer accessible after the broadcaster discontinues broadcasting. Such restrictions can often prevent users who were unable to view the live content stream from accessing content that is relevant and of interest. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, live content streams that are broadcasted live can be converted to on-demand post live media content items after broadcasting concludes. For example, in some embodiments, a live content stream can be converted to a post live media content item after its broadcasting concludes. In some embodiments, the post live media content item is ephemeral and remains accessible through a social networking system for a predefined period of time (e.g., 24 hours). In various embodiments, the post live media content item can be accessed to view a replay of the live content stream. In some embodiments, the replayed content includes comments that were submitted by the broadcaster and/or viewers during the live content stream. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a live stream module 106, a follow module 108, an interaction module 110, a story module 112, and a post live module 114. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. The content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 120, as shown in the example system 100. The at least one data store 120 can be configured to store and maintain various types of data. For example, the data store 120 can store information describing various content that is being broadcasted live or has been posted by users of a social networking system. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user specified settings, content produced or posted by users, and various other types of user data.

The content module 104 can be configured to provide users with access to content (e.g., media content items) that is available through a social networking system. In some instances, this content can include media content items that are posted in content feeds accessible through the social networking system. For example, the content module 104 can provide a first user with access to media content items through an interface that is provided by a software application (e.g., a social networking application) running on a computing device of the first user. Such media content items may include previously posted media content items as well as content that is being streamed live (e.g., live content streams). The first user can also interact with the interface to post media content items to the social networking system. Such media content items may include text, images, audio, and videos, for example. For example, the first user can submit a post to be published through the social networking system. In some embodiments, the post can include, or reference, one or more media content items. The social networking system can then provide the media content items through the social networking system including, for example, in one or more content feeds. In some embodiments, the interface can also include an option for live streaming content through the social networking system. When initiating a live content stream, the live stream module 106 can be utilized to communicate data (e.g., audio data, video data, etc.) corresponding to the content to be streamed live from the computing device and through the social networking system. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream. Another user operating a computing device can access the live content stream through the social networking system. For example, the user may select an option to view the live content stream and, in response, the social networking system can send data corresponding to the live content stream to the computing device of the user. In this example, the social networking system can continue sending data corresponding to the live content stream until, for example, the broadcaster of the live content stream discontinues streaming or if the user selects an option to discontinue playback of the live content stream.

In various embodiments, other users of the social networking system can access media content items posted by the first user. In one example, the other users can access the media content items by searching for the first user by user name or for relevant search terms through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 108 can process the user's request by identifying the user as a follower of (or "friend" of) the first user in the social networking system. As a result, some or all media content items that are posted (or being streamed live) by the first user can automatically be included in the respective content feed of the user. If the user decides that they no longer want to see content from the first user in their respective content feed, the user can select an option through the interface to unsubscribe from, or "unfollow", the first user. As a result, the follow module 108 can remove the association between the user and the first user so that media content items posted by the first user are no longer included in the content feed of the user.

In some instances, users may want to interact with posted media content items. For example, a user may want to endorse, or "like", a media content item. In this example, the user can select an option provided in the interface to like the desired media content item. The interaction module 110 can determine when a user likes a given media content item and can store information describing this relationship. The interaction module 110 can also determine when other forms of user interaction are performed and can store information describing the interaction (e.g., information describing the type of interaction, the identity of the user, the identity of the user that posted the media content item, and the media content item, to name some examples). For example, the user may want to post a comment in response to a media content item. In this example, the user can select an option provided in the interface to enter and post the comment for the desired media content item. The interaction module 110 can determine when a user posts a comment in response to a given media content item and can store information describing this relationship. Other forms of user interaction can include emoji-based reactions to a media content item (e.g., selecting an option that corresponds to a particular reaction emoji, e.g., happy, sad, angry, etc.), for example.

In some embodiments, the story module 112 can provide an option that allows users to post their content as stories. In such embodiments, each user has a corresponding story (or story feed) in which the user can post content. When a user's story is accessed by another user, the story module 112 can provide content posted in the story to the other user for viewing. In general, content posted in a user's story may be accessible by any user of the social networking system. In some embodiments, content posted in a user's story may only be accessible to followers of the user. In some embodiments, user stories expire after a pre-defined time interval (e.g., every 24 hours). In such embodiments, content posted in stories is treated as ephemeral content that is made inaccessible once the pre-defined time interval has elapsed. In contrast, content posted in a user (or follower) content feed can be treated as non-ephemeral content that remains accessible for an indefinite period of time.

In various embodiments, the post live module 114 can be configured to provide various options for converting live content into on-demand content. For example, in various embodiments, the post live module 114 can provide an option to convert a concluded live content stream to a post live media content item. More details regarding the post live module 114 will be provided below with reference to FIG. 2.

FIG. 2 illustrates an example of a post live module 202, according to an embodiment of the present disclosure. In some embodiments, the post live module 114 of FIG. 1 can be implemented as the post live module 202. As shown in FIG. 2, the post live module 202 can include a story module 204, a story collection module 206, and a skip module 208.

In general, a user operating a computing device can access (e.g., view) a live content stream through a content provider. In one example, the live content stream may be accessible through a content feed corresponding to the user. In another example, the user may have searched for the live content stream by, for example, submitting queries through a search engine or navigating through various media content presented through an interface. When accessed, a content provider can encode and send data corresponding to the live content stream to the computing device of the user. The computing device can decode and present video data corresponding to the live content stream, for example, in an interface being provided through a display screen of the computing device. Any audio data corresponding to the live content stream can be played or reproduced, for example, through an audio output source (e.g., speaker(s)) associated with the computing device. In some embodiments, while the live content stream is being accessed, the interface can provide the user with one or more options for interacting with the live content stream. For example, the interface can include an option for "liking" the live content stream, one or more options for reacting to the live content stream, or an option for posting comments in response to the live content stream, to name some examples.

In various embodiments, users can access live content streams even after the live content streams end (or conclude). For example, in some embodiments, a live content stream can be converted to a post live media content item after concluding. In such embodiments, the story module 204 generates a post live media content item for the live content stream (i.e., a copy of the live content stream) that can be accessed (or viewed) on demand. In some embodiments, the story module 204 generates the post live media content item as an ephemeral media content item. In such embodiments, the post live media content item is accessible through the social networking system for a pre-defined period of time after which the post live media content item is no longer accessible. For example, the post live media content item may be an ephemeral media content item that is accessible during a 24-hour period of time. The 24-hour period may begin, for example, when the post live media content item is made available through the social networking system or at pre-defined intervals (e.g., daily). In some instances, users viewing the live content stream may have posted comments during the broadcast. In some embodiments, when generating the post live media content item, the story module 204 also generates a comments feed for the post live media content item. The comments feed can be replayed during presentation of the post live media content item. For example, comments can be shown as overlays as the post live media content item is presented. In some embodiments, the comments feed includes some, or all, of the comments that were posted during the live content stream broadcast. In some embodiments, comments included in the comments feed are organized and presented based on their respective timestamps (e.g., chronologically). In some embodiments, a customized comment feed is generated for each viewer accessing the post live media content item. In such embodiments, the customized comment feed includes a sampling of comments posted during a live broadcast of the post live media content item including any comments that were posted by the viewer during the live broadcast.

In some instances, a user may broadcast multiple live content streams over a given period of time that are subsequently converted to post live media content items. In some embodiments, when multiple post live media content items are posted within a pre-defined period of time (e.g., 24-hour period), the story collection module 206 organizes the multiple post live media content items as a collection. In some embodiments, the collection can be made accessible through the social networking system. When accessed, the multiple post live media content items can be presented, for example, in chronological order. In some embodiments, the collection is ephemeral. In such embodiments, any post live media content items included in the collection remain accessible for a pre-defined period of time associated with the collection after which the post live media content items are no longer accessible.

In various embodiments, the skip module 208 can generate respective skip points for various post live media content items. In some embodiments, each skip point generated for a given post live media content item is associated with a corresponding start time at which playback of the post live media content item begins. For example, a first skip point for a post live media content item may be associated with a start time of 0:30 (or after 30 seconds of playback) and a second skip point may be associated with a start time of 2:14 (or after 2 minutes and 14 seconds of playback). In some embodiments, when generating skip points for a post live media content item, the skip module 208 can vary the number of skip points generated and/or intervals at which those skip points are generated. For example, in some embodiments, skip points for a post live media content item can be generated based on an overall playback duration of the post live media content item. In some embodiments, the skip points are positioned at equal time intervals. For example, a post live media content item having an overall playback duration of 60 seconds can have a first skip point with a start time of 0:10 (or after 10 seconds of playback), a second skip point with a start time of 0:20 (or after 20 seconds of playback), a third skip point with a start time of 0:30 (or after 30 seconds of playback), a fourth skip point with a start time of 0:40 (or after 40 seconds of playback), and a fifth skip point with a start time of 0:50 (or after 50 seconds of playback). In some embodiments, the skip points are spaced based on a percentage of the overall playback duration of the post live media content item. For example, in some embodiments, skip points can be positioned so that accessing each skip point advances playback of the post live media content item by some percentage (e.g., 20 percent). In some embodiments, skip points are positioned at variable time intervals. For example, in some embodiments, skip points for a post live media content item can be determined based on an amount of viewer feedback (e.g., likes, comments, etc.) received during various portions of a previously live broadcast of the post live media content item. For example, the skip module 208 can determine that a first portion and a second portion of a post live media content item received a threshold amount of viewer feedback. In this example, the skip module 208 can create a first skip point having a start time that begins at (or just before) the first portion of the post live media content item and a second skip point having a start time that begins at (or just before) the second portion of the post live media content item. Many variations are possible.

In some embodiments, skip points associated with a post live media content item can be accessed during playback of the post live media content item. For example, in some embodiments, skip points can be accessed in response to touch screen gestures. For example, while a post live media content item is being presented through a display screen of a computing device, a user operating the computing device can perform a first tap gesture to advance to a first skip point, a second tap gesture to advance to a second skip point, and a third tap gesture to advance to a third skip point in the post live media content item. Many variations are possible.

Figure 3A:
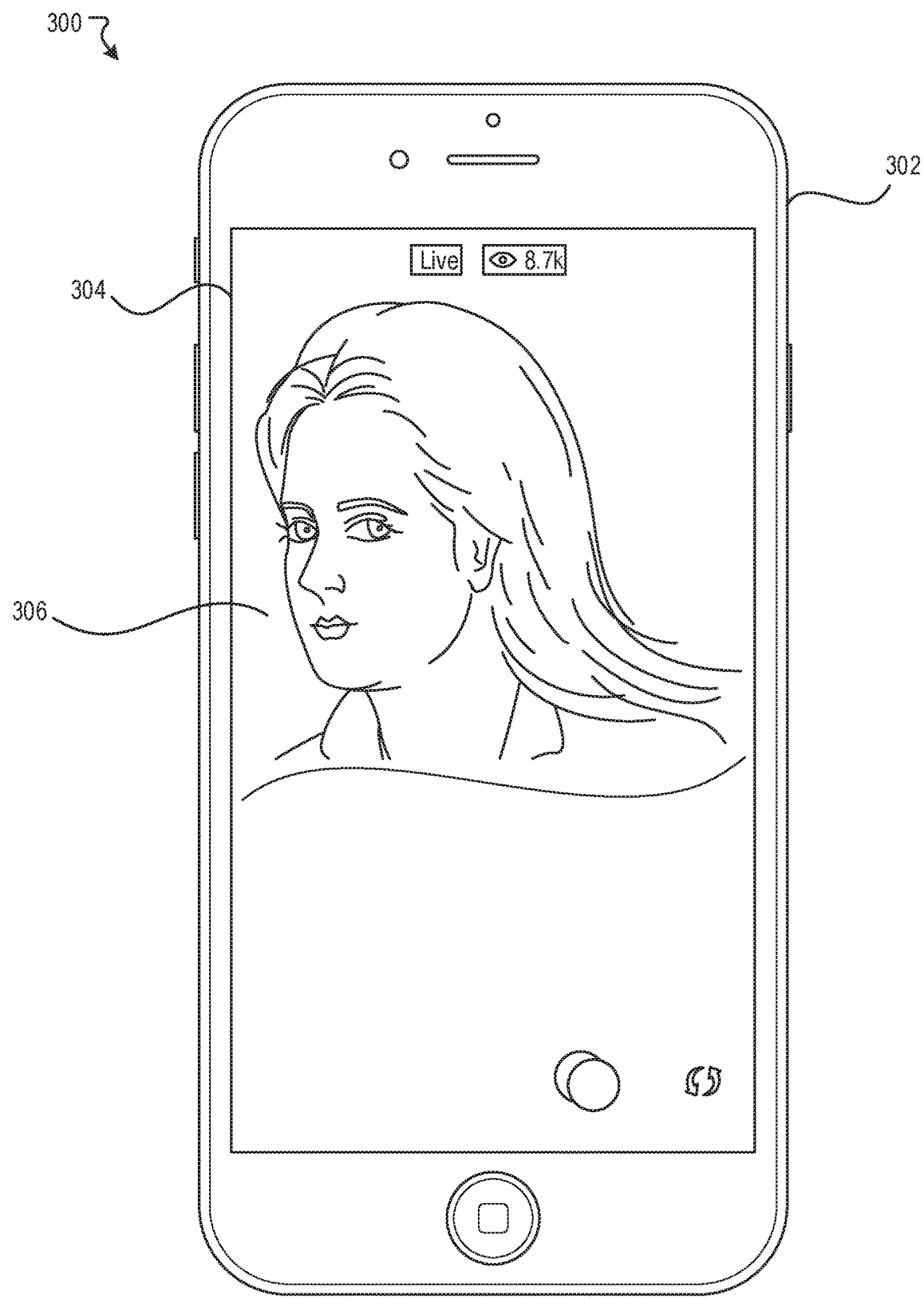
FIGS. 3A-3B illustrate example interfaces, according to an embodiment of the present disclosure.
Figure 3B:
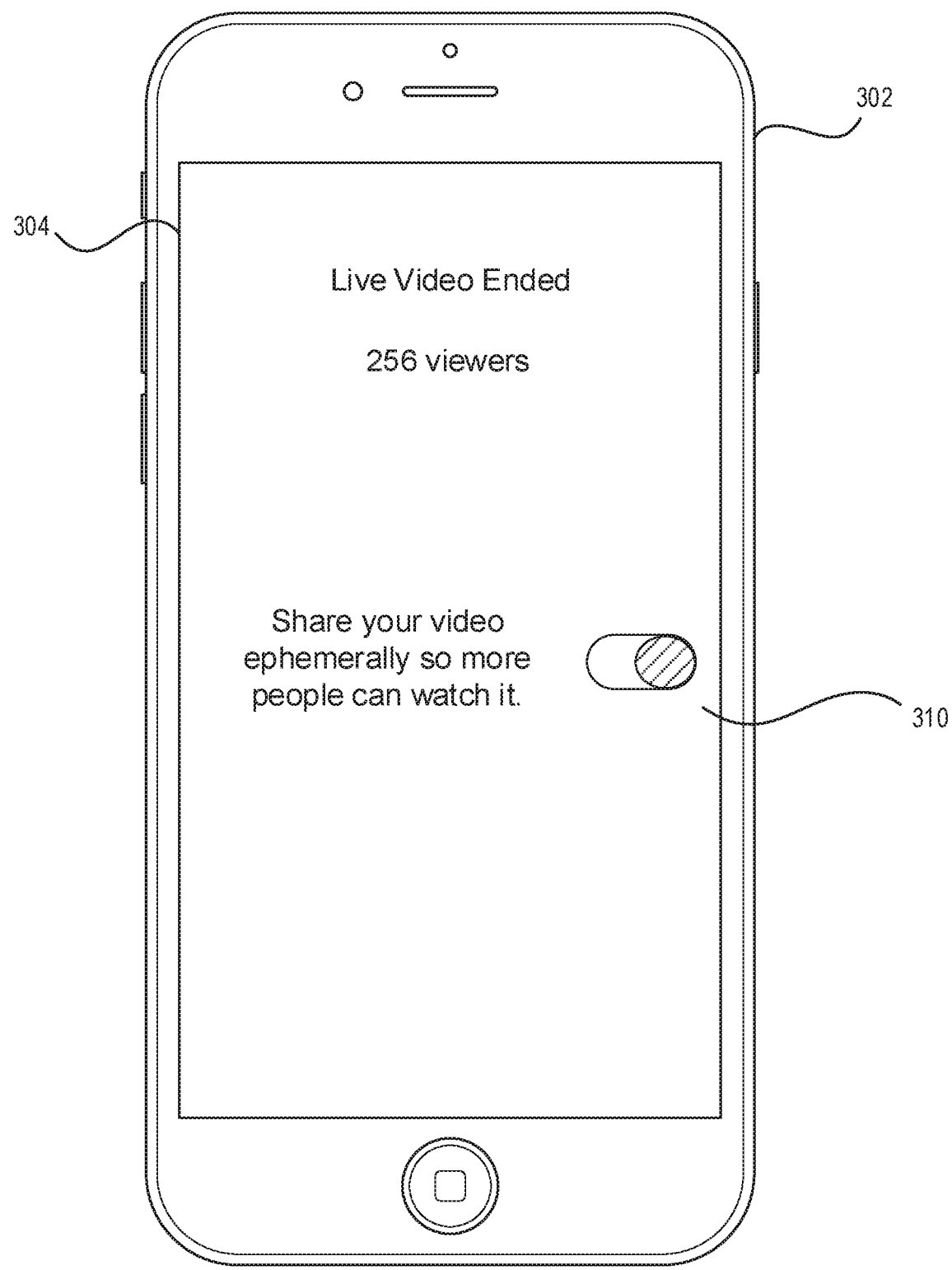

FIG. 3A illustrates an example 300 of an interface 304 for streaming live content, according to an embodiment of the present disclosure. The interface 304 is presented on a display screen of a computing device 302. The interface 304 may be provided through an application (e.g., a web browser, a social networking application, etc.) running on the computing device 302. In this example, a user (e.g., broadcaster) operating the computing device 302 is broadcasting a live content stream that is being recorded using the computing device 302. As a result, the interface 304 includes a region 306 in which the live content stream being broadcasted is displayed. In some embodiments, after broadcasting of the live content stream ends (or concludes), the interface 304 provides an option 310 that can be selected to convert the live content stream to a post live media content item, as illustrated in the example of FIG. 3B. Once selected, the live content stream is converted to a post live media content item that can be accessed on demand. In some embodiments, the post live media content item may be surfaced as an ephemeral media content item (e.g., story) that is accessible for a pre-defined period of time. Many variations are possible.

Figure 4A:
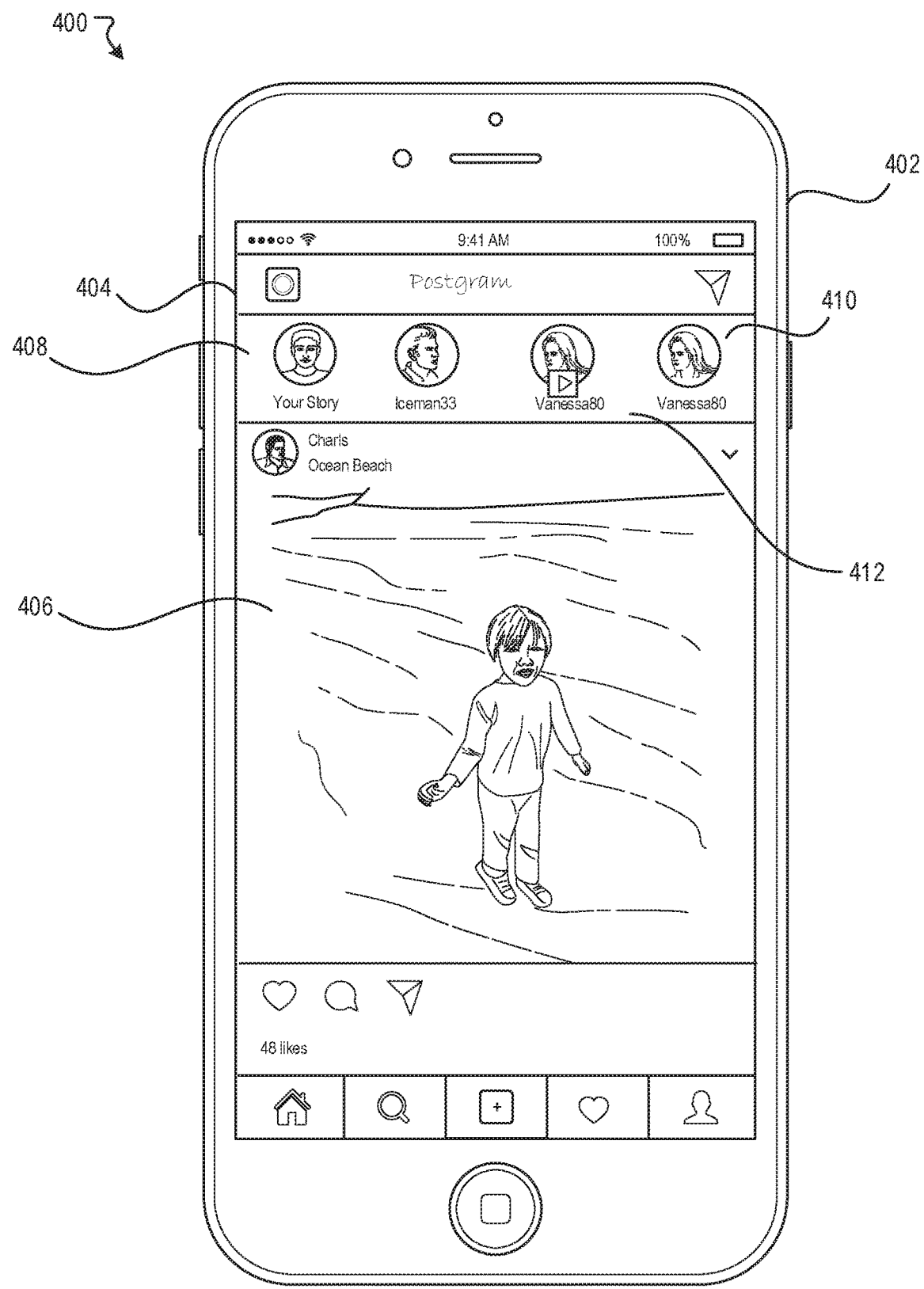
FIGS. 4A-4D illustrate example interfaces, according to an embodiment of the present disclosure.

FIG. 4A illustrates an example 400 of an interface 404, according to an embodiment of the present disclosure. The interface 404 is presented on a display screen of a computing device 402. The interface 404 may be provided through an application (e.g., a web browser, a social networking application, etc.) running on the computing device 402. In this example, the interface 404 includes a region 406 for accessing content (e.g., content in a content feed). The interface 404 also includes a media tray region 408 from which user stories can be accessed. In this example, the media tray region 408 displays avatars corresponding to users that have posted stories. For example, the media tray region 408 includes an avatar 410 that can be selected to access one or more ephemeral stories posted by the user Vanessa80. In some embodiments, live content streams that have been converted to post live media content items are also surfaced in the media tray region 408. In some embodiments, a user operating the computing device 402 can access any stories and/or post live media content items included in the media tray region 408. In some embodiments, once a story and/or post live media content item is accessed, other stories and/or post live media content items included in the media tray region 408 are also played chronologically based on post time. In some embodiments, the user can select an option so only post live media content items are played. Many variations are possible.

Figure 4B:
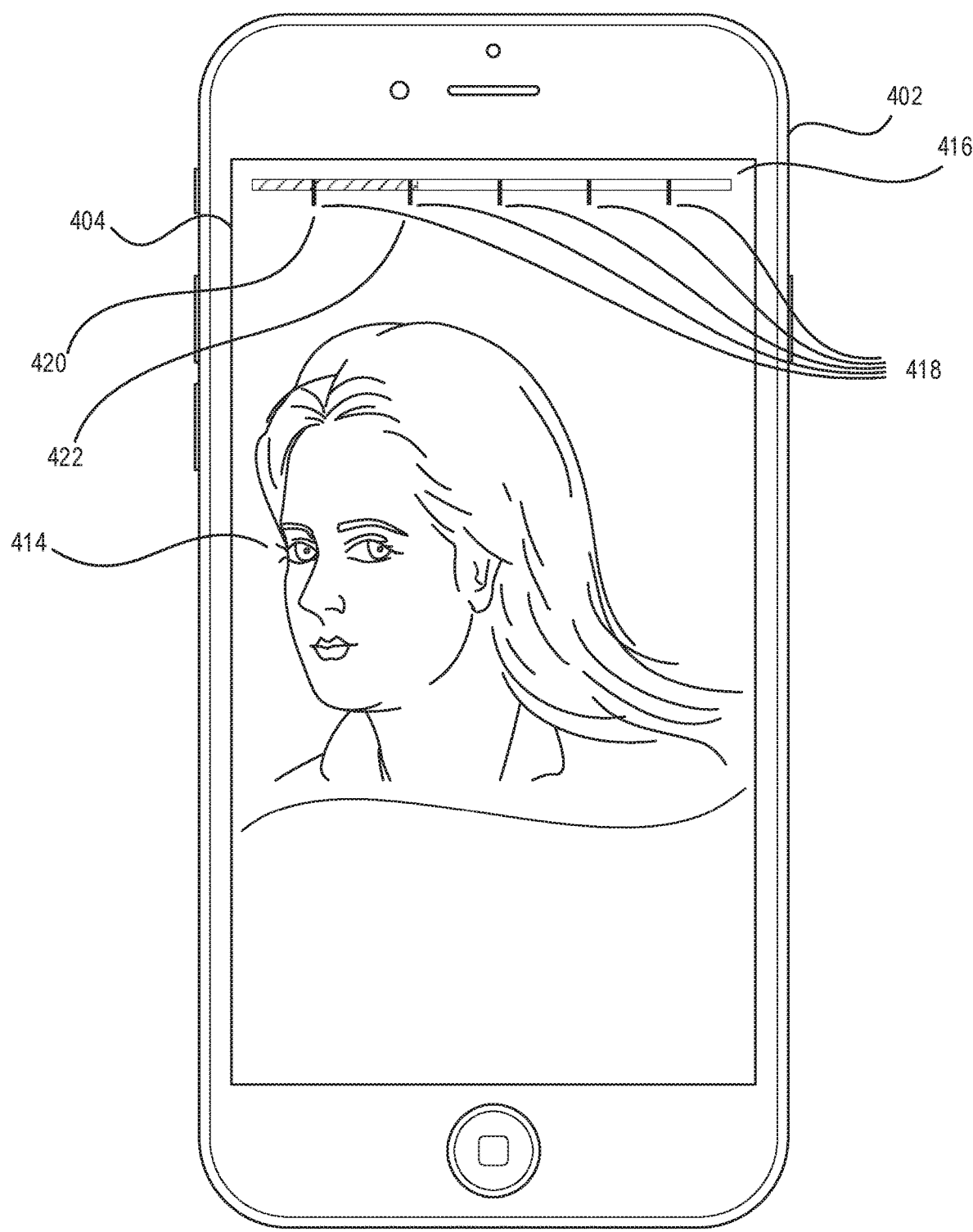

In some embodiments, avatars corresponding to users that published post live media content items are shown separately in the media tray region 408 from avatars that reference post live media content items. For example, in FIG. 4A, the media tray region 408 includes an avatar 412 corresponding to the user Vanessa80 that is distinct from the avatar 410 which also corresponds to the user Vanessa80. The avatar 412 can be selected to access a post live media content item that was published by the user Vanessa80, as illustrated in the example of FIG. 4B. In FIG. 4B, the interface 404 has been updated to present the post live media content item in a region 414. In this example, the interface 404 provides a playback indicator 416 that visualizes or indicates a playback duration of the post live media content item. In some embodiments, the interface 404 can indicate a set of skip points 418 associated with the post live media content item being presented. In some embodiments, a user operating the computing device 402 can perform one or more touch screen gestures to access skip points. For example, as the post live media content item is played, the user can perform a tap gesture to advance playback of the post live media content item to a first skip point 420. In this example, the user can perform another tap gesture to advance playback of the post live media content item to a second skip point 422, and so on. Many variations are possible.

Figure 4C:
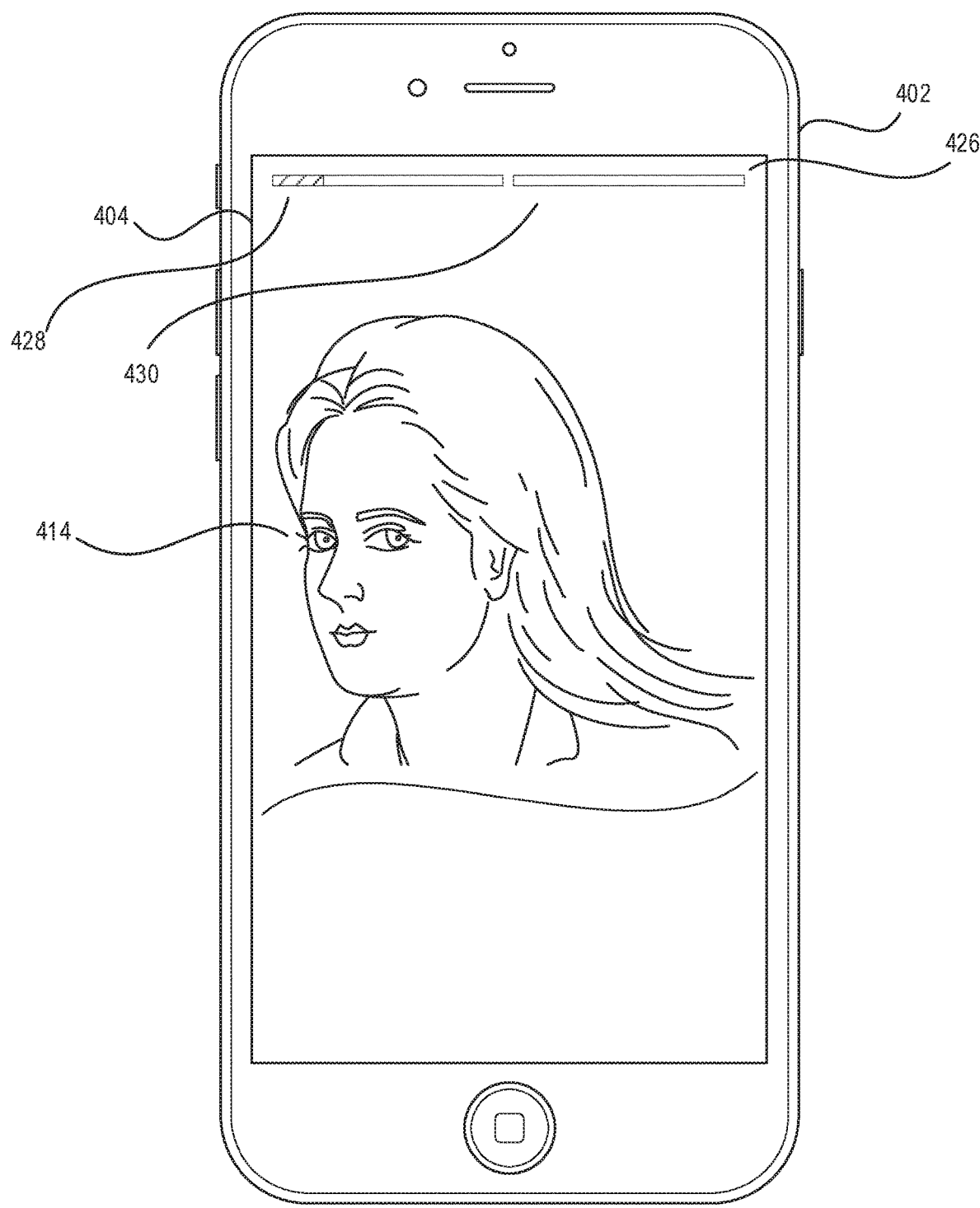
Figure 4D:
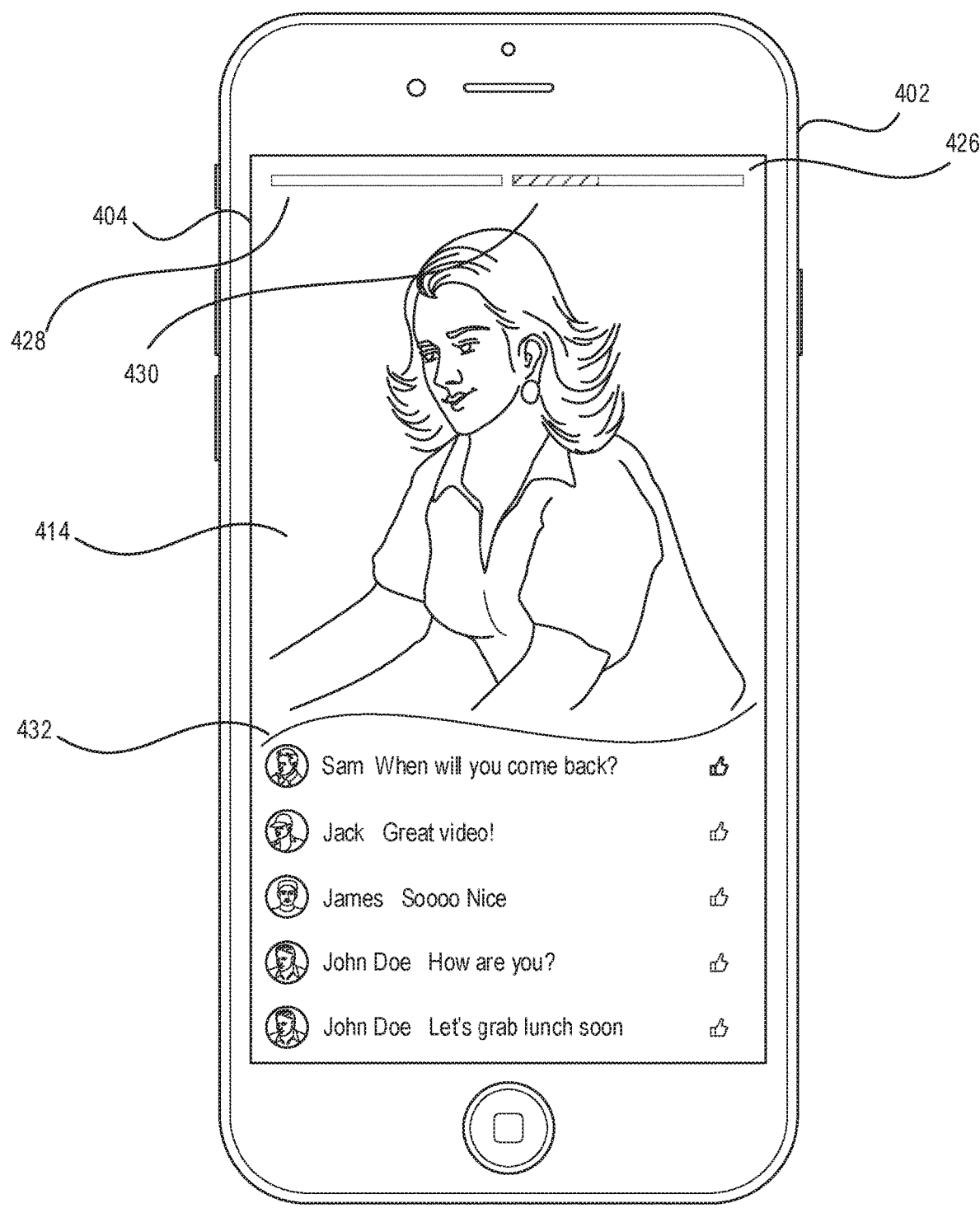

In some instances, the user Vanessa80 may have published multiple post live media content items that have been organized as a collection. In such instances, selecting the avatar 412 can result in the multiple post live media content items being presented, as illustrated in the examples of FIGS. 4C-4D. For example, in FIG. 4C, the collection includes a first post live media content item and a second post live media content item. In this example, the interface 404 has been updated to present the first post live media content item in the region 414. In this example, the interface 404 provides a playback indicator 426 that visualizes a playback duration of the multiple post live media content items. For example, the playback indicator 426 includes a first indicator 428 for the first post live media content item and a second indicator 430 for the second post live media content item. The user operating the computing device 402 can skip (or fast forward) through the first post live media content item based on its skip points as described above. The user can also select an option to skip the first post live media content item entirely and access the second post live media content item instead, as illustrated in the example of FIG. 4D. In this example, the region 414 is updated to present the second post live media content item. Further, the second indicator 430 is now actively providing a playback status for the second post live media content item. In some embodiments, a comment feed 432 including comments posted during a live broadcast of the second post live media content item can also be presented during playback of the second post live media content item, as shown in FIG. 4D. Many variations are possible.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a determination is made that broadcasting of a live content stream has concluded. At block 504, the concluded live content stream is converted to a post live media content item. At block 506, the post live media content item corresponding to the concluded live content stream is published through the social networking system. The post live media content item remains accessible through the social networking system for a pre-determined period of time.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
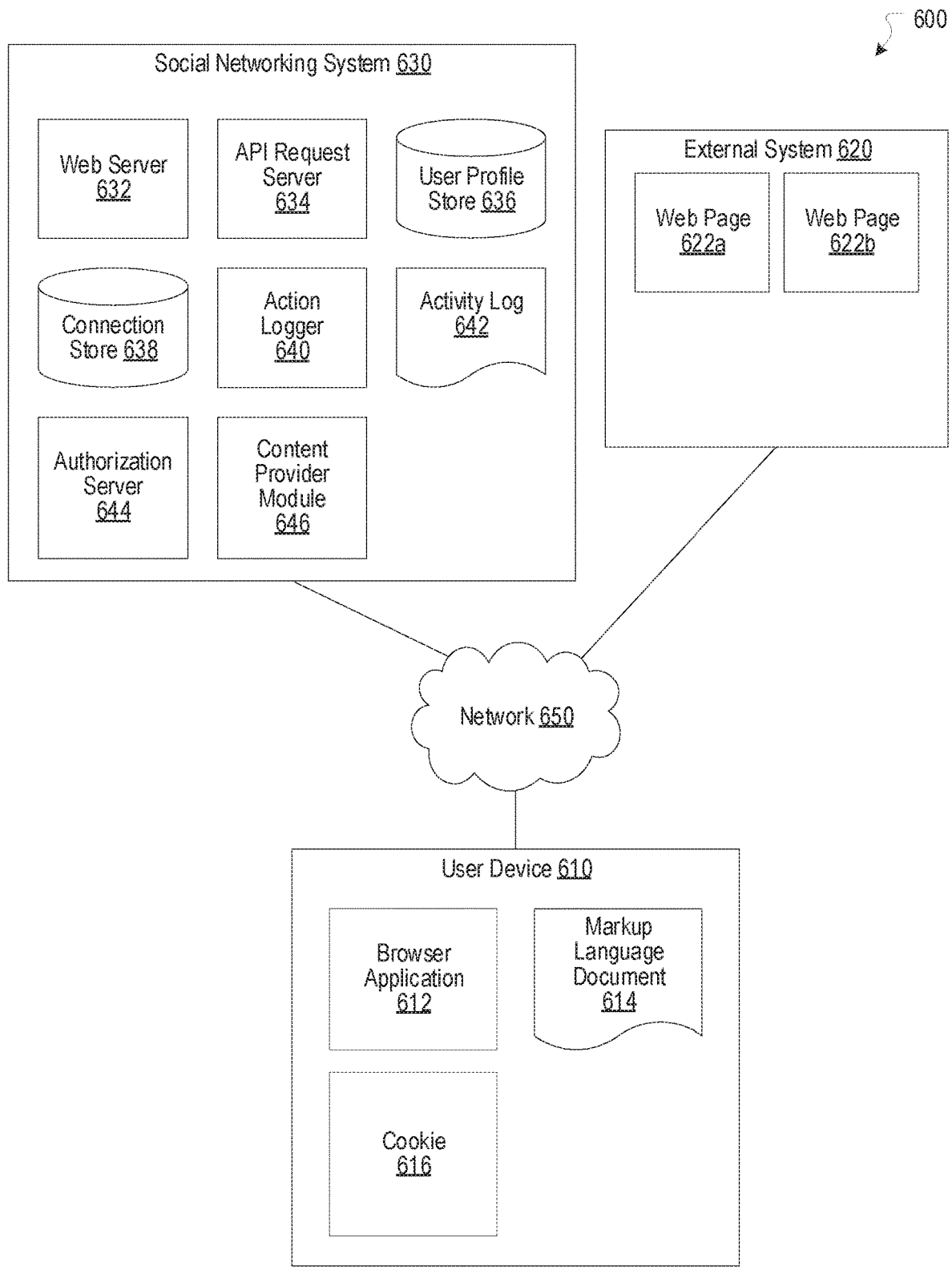
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, one or more functionalities of the content provider module 646 can be implemented in the user device 610. As discussed previously, it should be appreciated that there can be many variations or other possibilities.

Hardware Implementation

Figure 7:
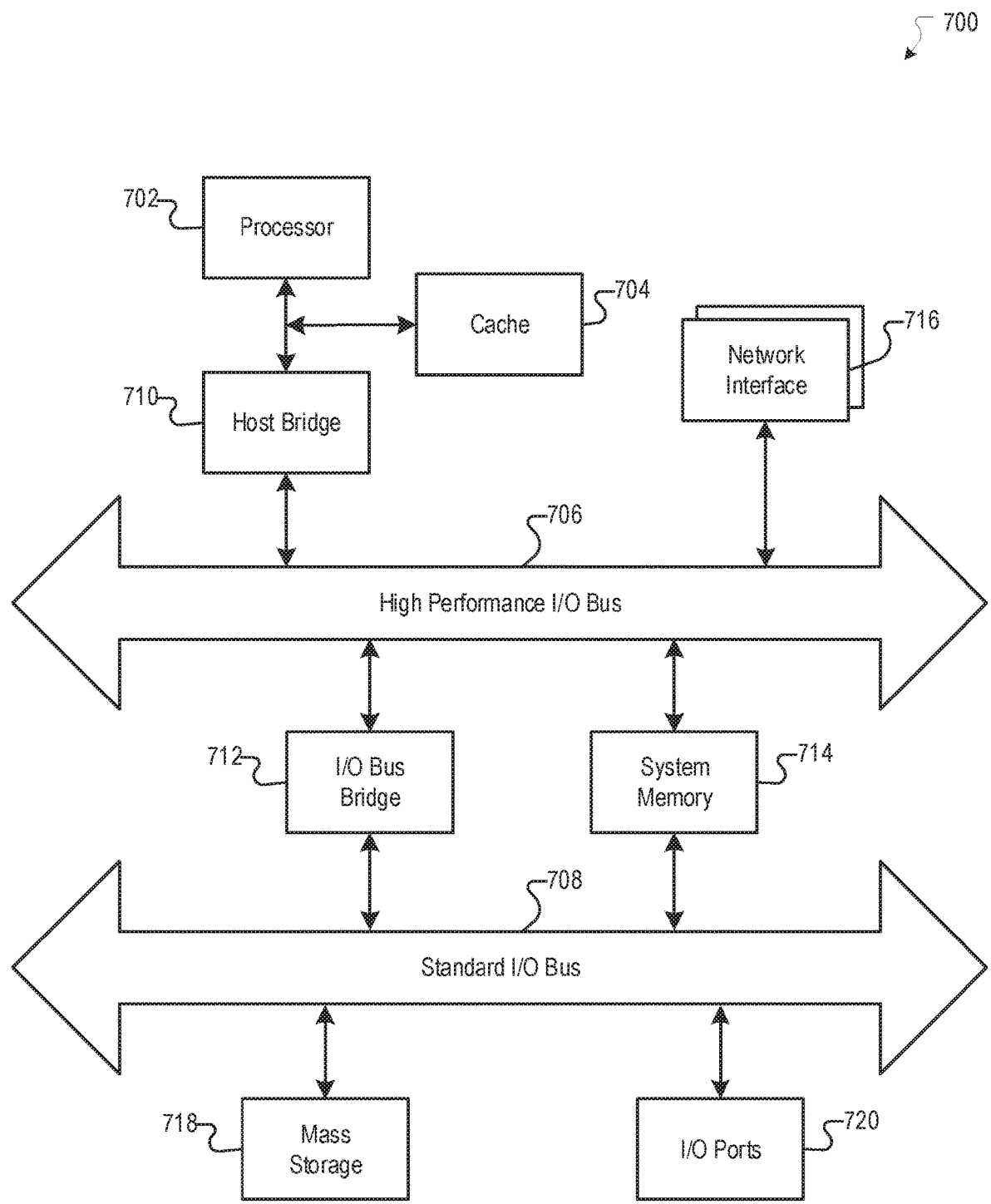
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, that a broadcast of a live content stream through a system has concluded;
   converting, by the computing system, the concluded live content stream to a post live media content item;
   providing, by the computing system, the post live media content item corresponding to the concluded live content stream through the system, wherein the post live media content item remains accessible through the system for a pre-determined period of time, wherein the post live media content item is made accessible to users of the system that follow at least one broadcaster of the live content stream in the system;
   organizing, by the computing system, the post live media content item in a collection that includes at least one different post live media content item associated with the at least one broadcaster of the live broadcast stream;
   determining, by the computing system, a viewing user has accessed the collection; and providing, by the computing system, post live media content items included in the collection in chronological order, wherein the providing the post live media content items included in the collection further comprises:

providing, by the computing system, the post live media content item and a customized comment feed that includes (i) a sampling of comments posted during the broadcast of the live content stream and (ii) any comments that were posted by the viewing user during the broadcast of the live content stream.

2. The computer-implemented method of claim 1, wherein the collection includes the post live media content items that were created by the at least one broadcaster during a pre-defined period of time.

3. The computer-implemented method of claim 2, wherein the users that access the collection are shown the post live media content item and a second post live media content item in chronological order.

4. The computer-implemented method of claim 1, wherein the users that access the post live media content item are shown customized feeds of sampled comments that were posted during broadcasting of the live content stream.

5. The computer-implemented method of claim 1, further comprising:

generating, by the computing system, a set of skip points for the post live media content item, wherein a skip point is associated with a corresponding start time at which the post live media content item is played.

6. The computer-implemented method of claim 5, wherein a given skip point is accessed in response to one or more touch screen gestures.

7. The computer-implemented method of claim 5, wherein a start time corresponding to a given skip point is determined based at least in part on an amount of viewer feedback received during at least one portion of the live content stream during the broadcast.

8. The computer-implemented method of claim 1, the method further comprising:

providing, by the computing system, an interface; and
providing, by the computing system, at least one avatar associated with at least one broadcaster of the post live media content item in a stories tray in the interface.

9. The computer-implemented method of claim 8, wherein the at least one avatar is able to be selected to access at least the post live media content item.

10. A system comprising:
at least one processor; and
a memory storing instructions that, when executed by the at least one processor, cause the system to perform:
determining that a broadcast of a live content stream through a system has concluded;
converting the concluded live content stream to a post live media content item;
providing the post live media content item corresponding to the concluded live content stream through the system, wherein the post live media content item remains accessible through the system for a pre-determined period of time, wherein the post live media content item is made accessible to users of the system that follow at least one broadcaster of the live content stream in the system;
organizing the post live media content item in a collection that includes at least one different post live media content item associated with the at least one broadcaster of the live broadcast stream;
determining a viewing user has accessed the collection; and
providing post live media content items included in the collection in chronological order, wherein the providing the post live media content items included in the collection further comprises:
providing the post live media content item and a customized comment feed that includes (i) a sampling of comments posted during the broadcast of the live content stream and (ii) any comments that were posted by the viewing user during the broadcast of the live content stream.

11. The system of claim 10, wherein the collection includes the post live media content items that were created by the at least one broadcaster during a pre-defined period of time.

12. The system of claim 11, wherein the users that access the collection are shown the post live media content item and a second post live media content item in chronological order.

13. The system of claim 10, wherein the users that access the post live media content item are shown customized feeds of sampled comments that were posted during broadcasting of the live content stream.

14. A non-transitory computer-readable storage medium including instructions that, when executed by at least one processor of a computing system, cause the computing system to perform a method comprising:
determining that a broadcast of a live content stream through a system has concluded;
converting the concluded live content stream to a post live media content item;
providing the post live media content item corresponding to the concluded live content stream through the system, wherein the post live media content item remains accessible through the system for a pre-determined period of time, wherein the post live media content item is made accessible to users of the system that follow at least one broadcaster of the live content stream in the system;
organizing the post live media content item in a collection that includes at least one different post live media content item associated with the at least one broadcaster of the live broadcast stream;
determining a viewing user has accessed the collection; and
providing post live media content items included in the collection in chronological order, wherein the providing the post live media content items included in the collection further comprises:
providing the post live media content item and a customized comment feed that includes (i) a sampling of comments posted during the broadcast of the live content stream and (ii) any comments that were posted by the viewing user during the broadcast of the live content stream.

15. The non-transitory computer-readable storage medium of claim 14, wherein the collection includes the post live media content items that were created by the at least one broadcaster during a pre-defined period of time.

16. The non-transitory computer-readable storage medium of claim 15, wherein the users that access the collection are shown the post live media content item and a second post live media content item in chronological order.

17. The non-transitory computer-readable storage medium of claim 14, wherein the users that access the post live media content item are shown customized feeds of sampled comments that were posted during broadcasting of the live content stream.

\* \* \* \* \*